United States Patent [19]

Evett

[11] 4,402,040
[45] Aug. 30, 1983

[54] DISTRIBUTED BUS ARBITRATION METHOD AND APPARATUS

[75] Inventor: Ronald C. Evett, Holliston, Mass.

[73] Assignee: Raytheon Company, Lexington, Mass.

[21] Appl. No.: 190,129

[22] Filed: Sep. 24, 1980

[51] Int. Cl.³ .............................................. G06F 9/46
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,983,540 | 9/1976 | Keller | 340/172.5 |
| 3,993,981 | 11/1976 | Cassarino, Jr. et al. | 364/200 |
| 4,028,664 | 6/1977 | Monahan | 340/172.5 |
| 4,030,075 | 6/1977 | Barlow | 340/172.5 |
| 4,096,569 | 6/1978 | Barlow | 364/200 |
| 4,096,571 | 6/1978 | Vander Mey | 364/200 |
| 4,096,572 | 6/1978 | Namimoto | 364/200 |
| 4,153,934 | 5/1979 | Sato | 364/200 |
| 4,229,791 | 10/1980 | Levy et al. | 364/200 |

OTHER PUBLICATIONS

Hansen, Stan, ORed Busing Features Distributed Control, Electronic Design, Aug. 16, 1980, pp. 143-147.

*Primary Examiner*—Mark E. Nusbaum
*Assistant Examiner*—Michael R. Fleming
*Attorney, Agent, or Firm*—Walter F. Dawson; Joseph D. Pannone

[57] ABSTRACT

A bus interconnects a plurality of elements to form a distributed signal processing system. When two or more elements attempt to use the bus simultaneously, a method of arbitration occurs whereby each element places its element arbitration code on assigned lines of the bus forming a composite complementary code. Arbitration apparatus in each element determines an element's priority relative to other elements based on said composite complementary code. The lower priority elements drop off the bus until only the highest priority is left whereupon it uses the bus to transmit its block of data. The distributed aribration apparatus has special advantage in a fault-tolerant system where it is critical that single point failures do not cause the complete system to f

26 Claims, 5 Drawing Figures

FIG. 2

ELEMENT ADDRESSES:

|   | E3 | E2 | E1 | E0 |          | E3N | E2N | E1N | E0N |
|---|----|----|----|----|----------|-----|-----|-----|-----|
| X = | 1 | 1 | 0 | 0 | $(12)_{10}$ | 0 | 0 | 1 | 1 |
| Y = | 1 | 0 | 1 | 1 | $(11)_{10}$ | 0 | 1 | 0 | 0 |
| Z = | 1 | 1 | 0 | 1 | $(13)_{10}$ | 0 | 0 | 1 | 0 |

FIRST ARBITRATION STEP:

| ELEMENT REQUESTING BUS | ELEMENT ARBITRATION CODE | | | | | | | |
|---|---|---|---|---|---|---|---|---|
|  | E3 | E3N | E2 | E2N | E1 | E1N | E0 | E0N |
| X | 1 | 0 | 1 | 0 | 0 | 1 | 0 | 1 |
| Y | 1 | 0 | 0 | 1 | 1 | 0 | 1 | 0 |
| Z | 1 | 0 | 1 | 0 | 0 | 1 | 1 | 0 |
| COMPOSITE COMPLEMENTARY CODE | 1 | 0 | 1 | 1 | 1 | 1 | 1 | 1 |

HIGHEST CONFLICT

Y ELEMENT WITH ZERO IN E2 BIT POSITION OF ADDRESS LOSES FIRST ARBITRATION STEP AND REMOVES ITS ADDRESS FROM BUS.

SECOND ARBITRATION STEP:

| ELEMENT REQUESTING BUS | ELEMENT ARBITRATION CODE | | | | | | | |
|---|---|---|---|---|---|---|---|---|
|  | E3 | E3N | E2 | E2N | E1 | E1N | E0 | E0N |
| X | 1 | 0 | 1 | 0 | 0 | 1 | 0 | 1 |
| Z | 1 | 0 | 1 | 0 | 0 | 1 | 1 | 0 |
| COMPOSITE COMPLEMENTARY CODE | 1 | 0 | 1 | 0 | 0 | 1 | 1 | 1 |

HIGHEST CONFLICT

X ELEMENT WITH A ZERO IN E0 BIT POSITION OF ADDRESS LOSES SECOND ARBITRATION STEP AND REMOVES ITS ADDRESS FROM BUS.

THIRD ARBITRATION STEP:

| ELEMENT REQUESTING BUS | ELEMENT ARBITRATION CODE | | | | | | | |
|---|---|---|---|---|---|---|---|---|
|  | E3 | E3N | E2 | E2N | E1 | E1N | E0 | E0N |
| Z | 1 | 0 | 1 | 0 | 0 | 1 | 1 | 0 |
| COMPOSITE COMPLEMENTARY CODE | 1 | 0 | 1 | 0 | 0 | 1 | 1 | 0 |

NO CONFLICTS

HENCE: ELEMENT Z WINS ARBITRATION

FIG. 3
METHOD OF ARBITRATION (EXAMPLE)

DISTRIBUTED BUS ARBITRATION METHOD AND APPARATUS

CROSS-REFERENCE TO CO-PENDING APPLICATIONS

The following patent application filed in the U.S. Patent Office and assigned to the same assignee as the instant application is hereby incorporated by reference in this application:

Distributed Signal Processing System, invented by George A. Works, having U.S. Ser. No. 168,899 filed in the U.S. Patent Office on July 11, 1980.

BACKGROUND OF THE INVENTION

In a distributed signal processing system comprised of a plurality of elements interconnected by at least one bus, a method of arbitration is required to determine which element will use the bus first when two or more elements attempt to use said bus simultaneously. Various methods and apparatus are known in the prior art for interconnecting such a system which may be comprised of elements functioning as signal processors, mass memories and input/output controllers.

One method of prior art for bus arbitration provides for a central arbiter to communicate with all the elements desiring to use a bus simultaneously. This central bus arbiter determines the elements with the highest priority and sends out a command signal permitting this high priority element to use the bus. A significant disadvantage of this type of system is that a single point failure in the central bus arbiter will cause the entire signal processing system to fail thereby defeating any fault-tolerant capability of the system.

Another approach in the prior art for bus arbitration has been referred to as daisy chaining. In this method, a bus available signal is transmitted from element to element in a priority order. An element desiring access to the bus captures the signal and thereby gets access to the bus. This technique provides a source of single point failures thereby rendering a system inoperative; it also is a relatively slow arbitration method and the polarity of elements may be determined in such a method by the physical position of the element hardware. Under these conditions, if an element is removed from the hardware configuration, rewiring is generally required so that a bus available signal may be transmitted past the vacant element location.

A third prior art method of bus arbitration provides for each device to simultaneously transmit its priority code as a string of pulses on signal lines separate from the main data bus. The number of said signal lines is determined by the numbering system and coding techniques used. If pulse coding is used, said pulses are sent to counters in each device. When a device receives a total count equal to its own priority code, it has won arbitration and gets access to the main data line. When the priority number received by a device counter does not equal its device priority number, said device withdraws from the arbitration process. This method of bus arbitration, however, requires additional signal lines and interface circuits for transmission and detection of device priority codes with the number of said lines and circuits being determined by the numbering system and coding technique selected.

In order to achieve fault-tolerance in a distributed signal processing system, the method of arbitration must be distributed throughout the elements making up the system. In this way, when a failure occurs in the arbitration apparatus within an element, the automatic removal of the complete faulty element from the system configuration does not affect the overall arbitration system nor the functioning of the remaining elements in the system. In addition, the minimization of the number of interface lines and circuits between system elements contributes to a higher reliability system.

SUMMARY OF THE INVENTION

The invention discloses a bus arbitration apparatus distributed within a plurality of elements comprising a signal processor, a mass memory and an input-output controller interconnected by a common bus forming a distributed signal processing system. Said bus arbitration apparatus performs bus arbitration which is the process of determining which element among a plurality of elements will get to use a bus first when two or more of said elements attempt to use said bus simultaneously for the transfer of information. Said bus arbitration apparatus, located in each of said elements, uses the same bus for performing bus arbitration as it does for performing information transfers.

Each of said elements is assigned a changeable priority address and comprises means for determining the bus priority of one element relative to another element when more than one element attempts to use said common bus simultaneously. The bus arbitration apparatus comprises means for generating an element arbitration code which includes the element's address and the complement of said address. When an element transfers said element arbitration code to said wire-ORed common bus for arbitration, a composite complementary code is formed from the logical ORing of said element arbitration codes simultaneously transferred to said bus. Said apparatus provides means for synchronizing the generation of said composite complementary code on said bus and means for decoding said composite complementary code. The decoding means removes the lower priority element arbitration codes from said common bus and thereby eliminates elements from the arbitration process in a sequential manner until only the highest priority element remains which then proceeds to use the bus for the transfer of information.

This invention may also be practiced by a method of providing bus arbitration for a plurality of elements requesting simultaneous use of a common bus, said method comprising the steps of each element generating a request to occupy said bus, and providing to said bus an element arbitration code, said bus providing the logical-OR of each bit of the element arbitration codes forming a composite complementary code, each element simultaneously decoding said composite complementary code identifying lower priority elements for removal from said bus, each element removing its element arbitration code from said bus when said element has a lower priority relative to another element supplying an arbitration code to said bus, said bus arbitration coding and decoding sequencing continuing until only the highest priority element remains on said bus, and said highest priority element using said bus for information transfer after arbitration is completed.

BRIEF DESCRIPTION OF THE DRAWINGS

Other and further objectives and advantages of the invention will become apparent with the accompanying drawings wherein.

DESCRIPTION OF THE PREFERRED EMBODIMENT

Figure 1:
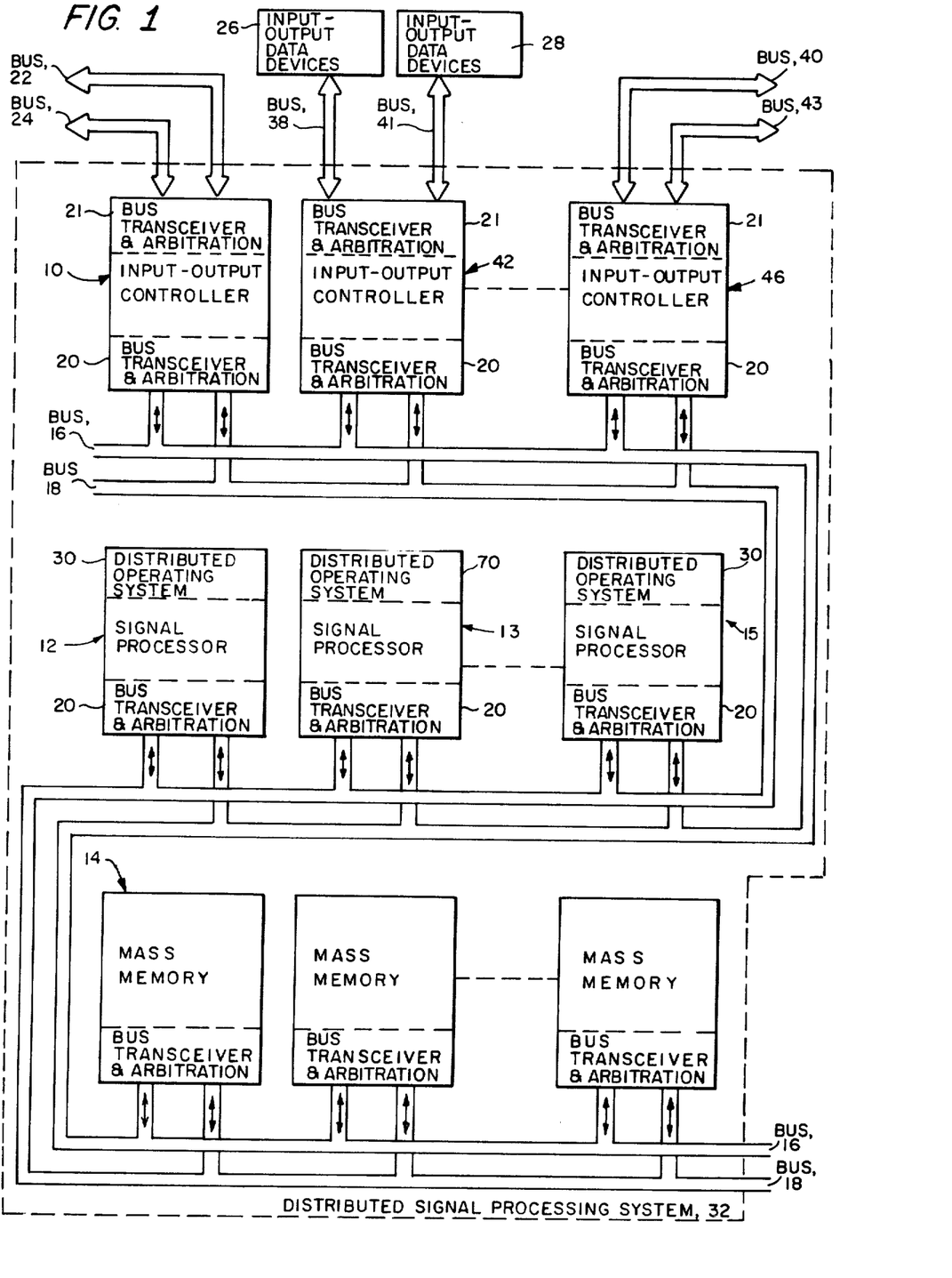
FIG. 1 is a functional block diagram of a distributed signal processing system illustrating a plurality of elements interconnected by at least one bus and comprising a distributed bus arbitration apparatus in each element.

Referring to FIG. 1, there is shown a block diagram of a distributed signal processing system (DSPS). The system includes a plurality of elements comprising identical input-output controllers (IOC) 10, signal processors (SP) 12 and mass memories (MM) 14. These said elements are interconnected by the dual redundant busses, bus 16 and bus 18 in a manner such that each element connects to each bus, and if one bus is removed from operation, the DSPS system remains operational. Although not shown in FIG. 1, power is supplied to each element in a system by a dual-redundant power distribution system in accordance with well-known practices.

Each of the elements 10, 12 and 14 in FIG. 1 contain bus transceivers 20, which provide the interface means for communication among the elements, and arbitration apparatus 20 which provides means for determining which element will gain access to a bus when there are simultaneous requests from two or more elements to use said bus. A distributed method of arbitration eliminates the need for a central bus arbiter or daisy chain bus request line and avoids the single-point failure modes inherent in such prior arbitration art.

The input-output controller element 10, as shown in FIG. 1, contains two additional busses, bus 22 and bus 24 and associated bus transceivers and arbitration 21 circuits in addition to bus 16 and bus 18; bus 22 and bus 24 provide the means to connect the system to input-output data devices 26 and 28, as illustrated by bus 38 and bus 41. In addition, bus 22 and bus 24 may be used to provide bus extension means for interconnecting multiple systems to form a DSPS network capable of solving more complex radar signal processing applications.

All the elements in the system in FIG. 1 are controlled by a distributed operating system (DOS) 30 located in signal processors 12, 13 and 15 as illustrated in FIG. 1, which is responsible for the management of all the DSPS elements so as to permit the orderly operation of assigned tasks. In accordance with the distributed nature of the signal processing system, the operating system is also organized as a distributed function with local control and management resources of a signal processor being performed by a local level segment, DOS-0, redundantly resident in ROM in every signal processor 12, 13 and 15. The high level system control of the entire distributed signal processing system is performed by the system level segment, DOS-1, which is stored in the mass memory 14 and operationally resides in the first signal processor 12, for example, assigned to be the executive. To insure fault-tolerance, a second signal processor 13 is assigned to monitor said DOS-1 executive, with an alternate executive (ADOS-1). If DOS-1 fails, ADOS-1 takes over and assigns its own executive monitoring task to another signal processor.

Figure 2:
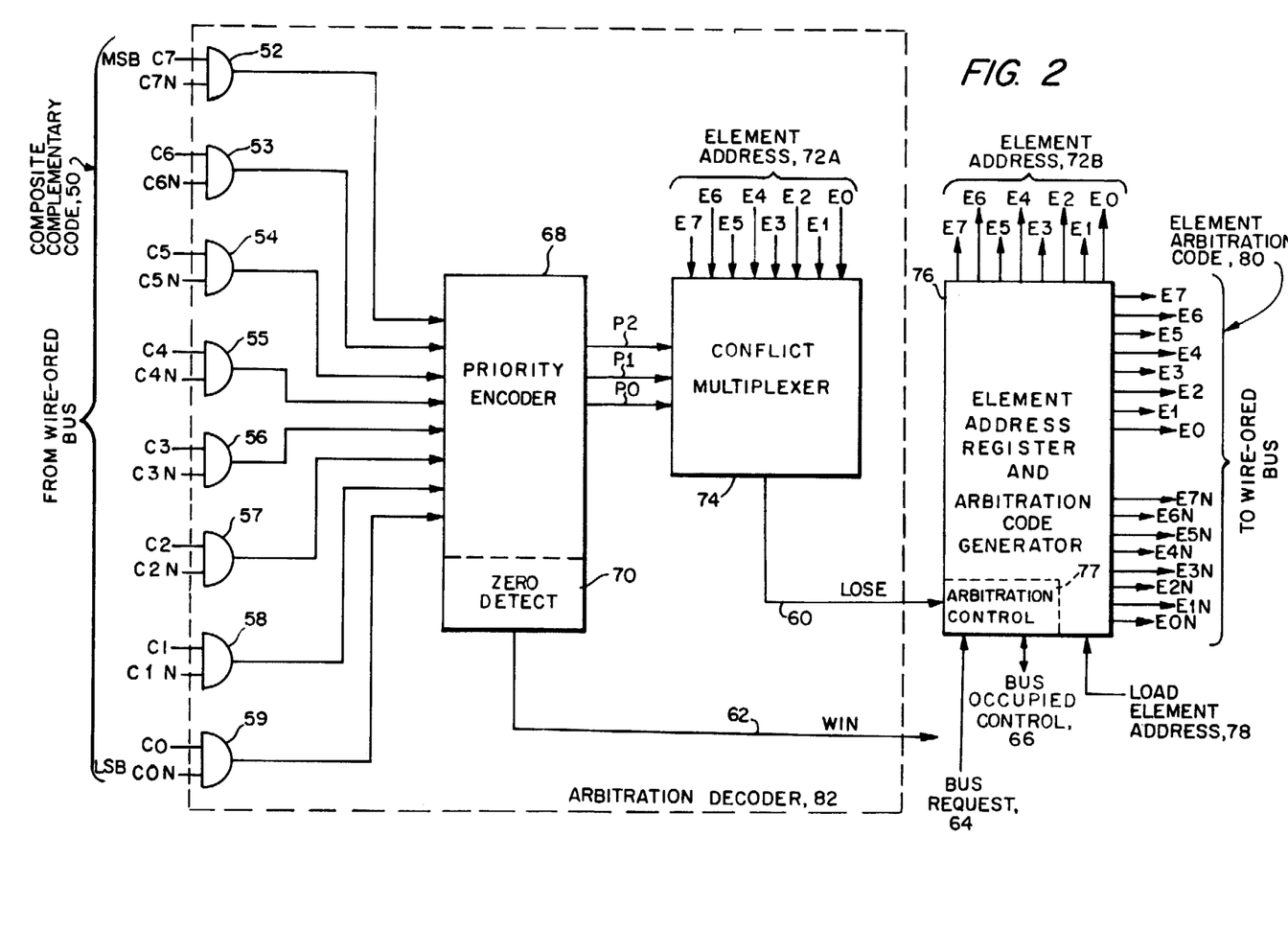
FIG. 2 is a functional block diagram of the invention comprising a bus arbitration apparatus.

The arbitration apparatus used for performing bus arbitration is shown in FIG. 2, and it is resident in each element of a distributed signal processing system shown in FIG. 1. Bus arbitration is the process of determining which element among a plurality of elements will get to use a bus first, based on a specific priority address assigned to each element when two or more of said elements attempt to use said bus simultaneously for the transfer of information. Whenever information must be transmitted out of an element in said system, the transmitting element must first obtain control of the bus. Each transmitting element within said system begins occupancy of a bus such as bus 16 in FIG. 1 by outputting a unique element arbitration code 80 (as shown in FIG. 2) onto said wire-ORed bus 16. Said arbitration code is based on the address of the element requesting use of the bus. It is called a one-of-two coding method comprising eight bits of the element address (E0 through E7) plus the eight bits of the complement of the element address (E0N through E7N) for a total of 16 bits in the preferred embodiment herein. However, said arbitration code may comprise more or less bits depending on application requirements. If several elements attempt to use the bus at the same time, bus priority must be established whereby a method of arbitration is employed in each element simultaneously to decide which element will first use the bus. This invention utilizes the data buses, for example, 16, 18, 22, or 24, to perform the method of arbitration.

The element address register and arbitration code generator 76 in FIG. 2 comprises an eight bit address register which generates an eight bit element address 72B that has been loaded into it by the load element address 78 input and also generates the element arbitration code 80 described hereinbefore. Arbitration control 77 is provided, as shown in FIG. 2, to determine if the common bus is occupied or already in use prior to placing an element arbitration code on said bus and also to provide the timing to synchronize the formation and decoding of the composite complementary code (CCC) 50 on said bus. In addition to the element address register and arbitration code generator 76 with the arbitration control 77, the remainder of the arbitration apparatus comprises an arbitration decoder 82. Said decoder contains eight AND gates 52 to 59, priority encoder 68 and conflict multiplexer 74. It performs the decoding of the composite complementary code 50.

The element arbitration code 80, as illustrated in FIG. 2, consisting of 16 bits from each element on a common bus, is detected on a bus as the composite complementary code 50. Signals C0 through C7 and C0N through C7N at the inputs of the AND gates 52 to 59 represent the wire-ORed composite complementary code 50 for all the elements wanting to use said bus. Two logical ones at the input of AND gate 59, which are the logical OR of all the E0 bits of the element arbitration codes and the logical OR of all the E0N bits of said code, for example, imply that an element with a logical one for that address bit and another element with a logical zero for that same address bit are on the bus, resulting in a priority conflict. However, if all the eight AND gate 52 to 59 outputs connecting to the priority encoder 68 are low (logical zero), there is no conflict because only one element arbitration code is on the bus and arbitration has been won resulting in the generation of the WIN signal 62. Said WIN signal 62 is generated by the zero detect 70 logic of the priority encoder 68 allowing the element requesting the bus to occupy it and to proceed with an information transmission.

When there is a priority conflict (indicated by two logical ones at the input of one or more AND gates 52 to 59) due to two or more elements wanting to occupy the bus simultaneously, then the priority encoder 68 generates a 3 bit code on signal lines P0, P1 and P2 in FIG. 2 which identifies the most significant element address bit in which a conflict exists as determined by the inputs to one of the said AND gates 52 to 59. The conflict multiplexer 74 receives said 3 bit code and looks up the eight bits of its element address E0 through E7 72A. If the particular bit in one of the eight address bit lines specified by the 3 bit code from the priority encoder 68 is zero, then the conflict multiplexer 74 generates a LOSE 60 signal signifying that this element has lost arbitration. Said LOSE signal connects to the arbitration control 77 causing the element's arbitration code to be removed from the bus; this occurs in all elements determined to have the same address bit conflict. This procedure of detecting address bit conflicts in the composite complementary code repeats itself for the various formations of composite complementary codes until only the highest priority element is left on the bus. The element with the highest numerical address always gets priority to use the bus, and the address of an element which determines priority is selected by the distributed operating system in a DSPS application.

Figure 3:
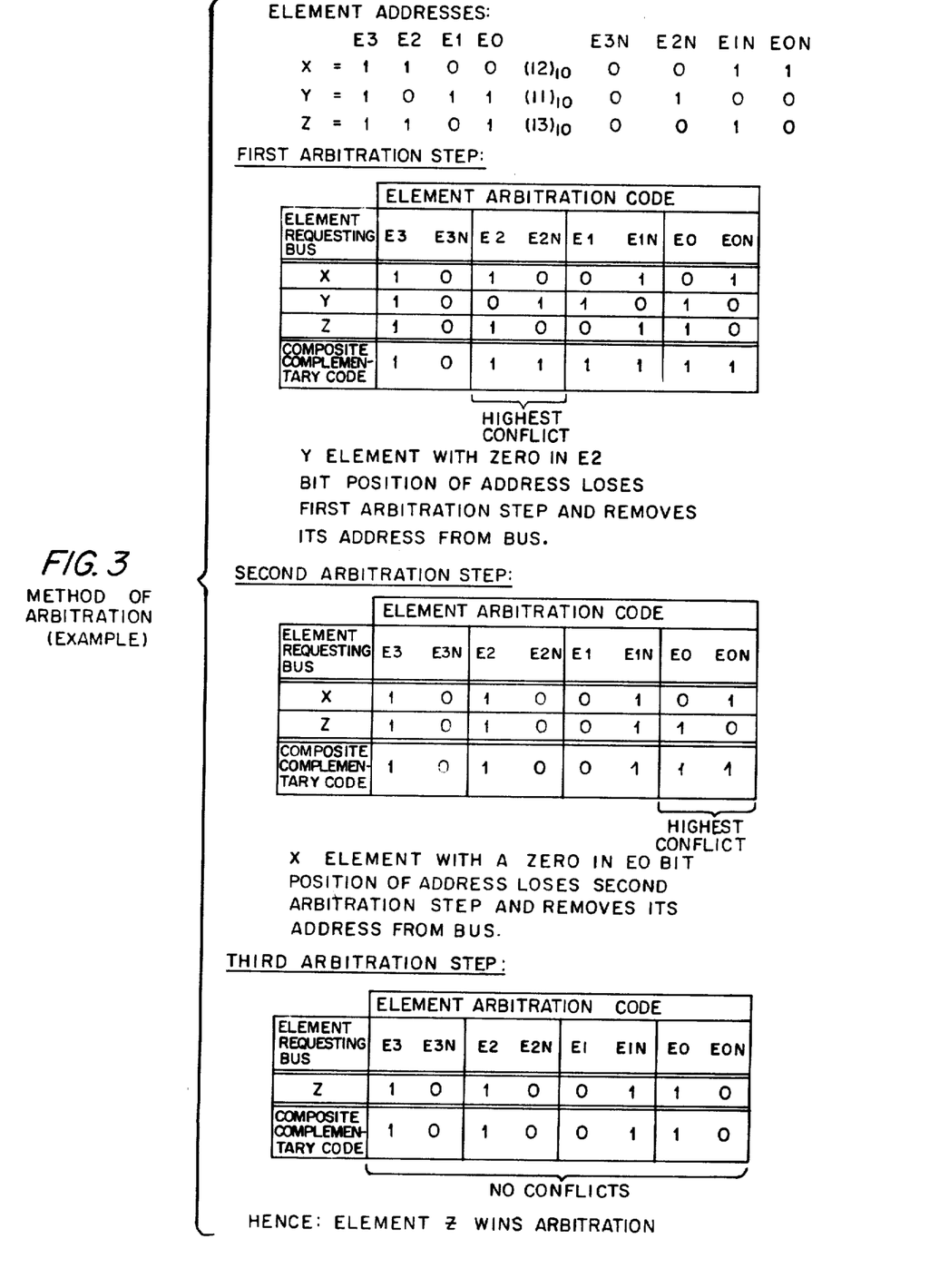
FIG. 3 is an example of the method of bus arbitration utilized in the present invention.

An example of the method of arbitration is shown in FIG. 3. Assume that there are three elements X, Y and Z with decimal addresses 12, 11 and 13, respectively, attempting to use a bus simultaneously. All three elements put their respective element arbitration codes, which consist of the element's binary address and its complement, on a bus as shown in FIG. 3 under the heading First Arbitration Step. The wire-ORed bus forms the composite complementary code and bus bits related by bit position are paired as shown in FIG. 3. If two "ones" occur in a particular composite complementary code bit pair position such as E2 and E2N, E1 and E1N, and E0 and E0N during the first arbitration step, then each of these pairs are defined as priority conflicts. Only the highest order conflict, located in the E2 and E2N position, gets decoded by the arbitration decoder 82 in each element whereby the element or elements containing a "zero" in the E2 bit of its element address lose arbitration and remove their addresses from the bus because of the presence of at least one logical "one" on the wire-ORed E2 bus bit indicating the presence of a higher priority element. In the example, therefore, element Y removes its element arbitration code from the bus which results in elements X and Z with their element arbitration codes on the bus producing a new composite complementation code as shown in the Second Arbitration Step. The highest and only conflict now exists in bit pair position E0 and E0N resulting in the arbitration decoder 82 in the X element generating a LOSE signal since there is a zero in bit position E0 of its element address and removing its element arbitration code from the bus. The Third Arbitration Step shows that no "one" priority conflicts exist in the now remaining composite complementary code which is the arbitration code of element Z. The method of arbitration is completed, and element Z has won the arbitration and use of the bus.

Figure 4:
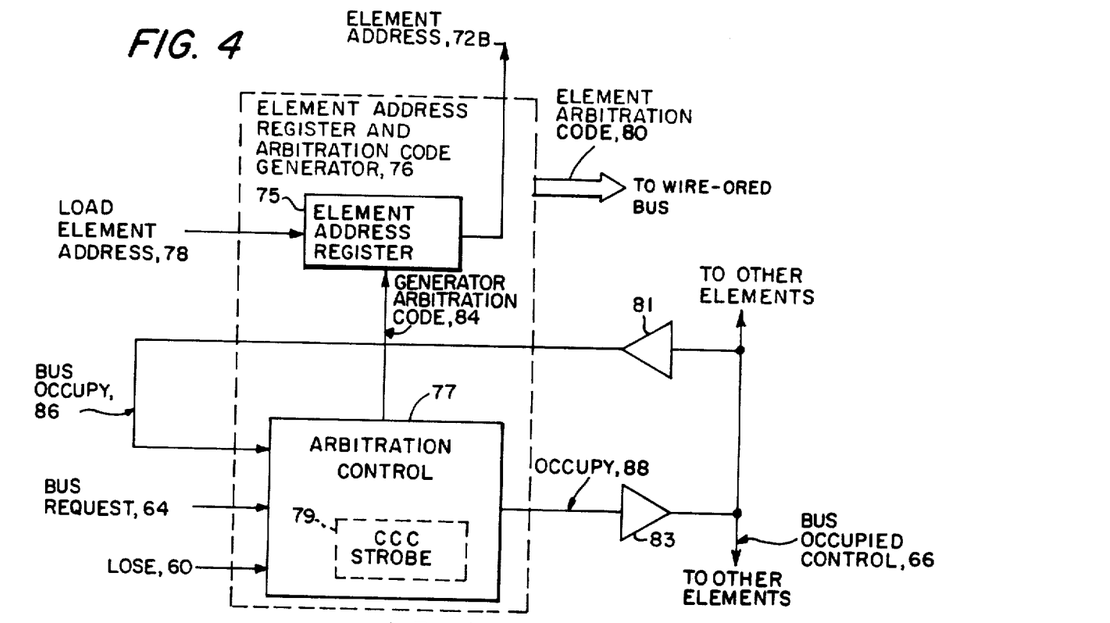
FIG. 4 is a functional block diagram of the arbitration control of the present invention.

Referring now to the BUS OCCUPIED CONTROL 66 line in FIG. 4, this line is one of the five control lines which together with 16 data lines comprise a bus such as bus 16 in FIG. 1. The other four control lines (not shown) include data transmitter ready, data receiver reply, element busy, and parity. When an element is ready to use a bus, it generates a BUS REQUEST 64 signal which causes the arbitration control 77 to check the BUS OCCUPY 86 line. If the bus is being used, the BUS OCCUPY 86 is set to a logical one and said element waits until the bus is no longer occupied. When the bus becomes unoccupied, the BUS OCCUPY 86 is set to a logical zero and the arbitration control 77 generates an OCCUPY signal on line 88 and the GENERATE ARBITRATION CODE signal on line 84. The inverters 81 and 83 provide bus interface isolation for the BUS OCCUPIED CONTROL 66 line. The CCC STROBE 79 generates the timing required to synchronize a composite complementary code formation and decoding sequence.

Figure 5:
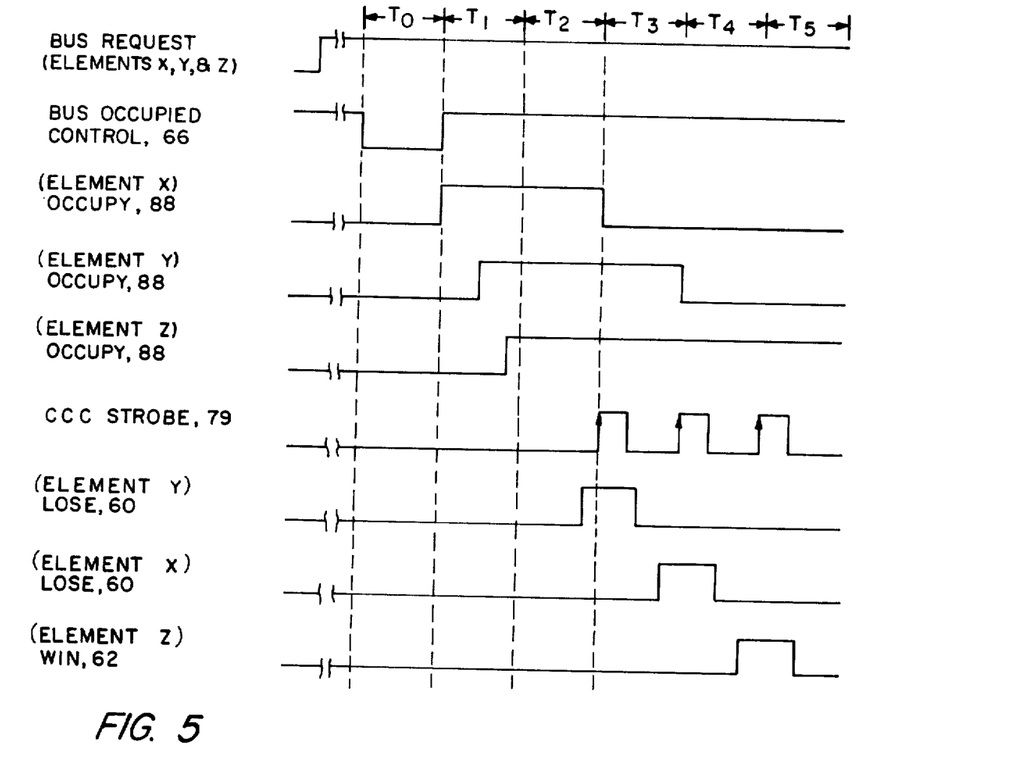
FIG. 5 is a timing diagram of the operation of the arbitration apparatus for the example described in FIG. 3.

The timing diagram of FIG. 5 illustrates the operation of the arbitration control 77 for the arbitration example shown in FIG. 3. Referring to FIG. 5, the three elements X, Y and Z request use of the bus by each of said elements generating a BUS REQUEST 64 signal and waiting until said bus becomes unoccupied. When the BUS OCCUPIED CONTROL 66 line goes to a logical zero, the arbitration control 77 in each element requesting use of the bus generates its OCCUPY signal 88 as a result of a BUS REQUEST 64 having been generated by said elements. Because of the different time delays inherent in the logic, each element generates its OCCUPY 88 signal at different times as illustrated in FIG. 5. However, the CCC STROBE 79 timing allows the specific time period of T0 plus T1 for elements to participate in an arbitration sequence. FIG. 5 shows that element X was the first to generate the OCCUPY 88 signal and it caused the BUS OCCUPIED 66 to go to a logical one state at the end of time period T0. All elements participating in said arbitration sequence must generate their OCCUPY 88 and GENERATE ARBITRATION CODE 84 signals before the end of time period T1. Time period T2 allows for the appearance on the bus of the element arbitration code 80 of each element requesting use of the bus and for the formation and decoding of a resulting composite complementary code on said bus. At the end of time period T2, the CCC STROBE 79 signal is generated and for the example in FIG. 3, the LOSE 60 signal is generated in element Y. The LOSE 60 signal causes the removal of the Y element arbitration code from the bus resulting in the formation on said bus of a new composite complementary code during time period T3 in FIG. 5. At the end of T3, CCC STROBE 79 occurs in each element resulting in the LOSE 60 signal being generated in element X. The element arbitration code for element X is removed from the bus by the arbitration control 77 and a new composite complementary code forms during time period T4. However, at this point in the arbitration sequence, no conflicts occur during the decoding of said composite code since only the element arbitration code of element Z remains on the bus. Therefore, the WIN 62 signal is generated in element Z during time period T5 and element Z then proceeds to transmit on said bus. As shown in FIG. 5, the element Z BUS REQUEST 64, the BUS OCCUPY 66 and the element Z OCCUPY 88 signals remain at the logical one state until element Z completes use of the bus.

This concludes the description of the preferred embodiment. However, many modifications and alterations will be obvious to one of ordinary skill in the art without departing from the spirit and scope of the inventive concept. Some of these modifications have been suggested herein. Therefore, it is intended that the scope of this invention be limited only by the appended claims.

What is claimed is:

1. In combination:
 a plurality of elements interconnected by an asynchronous common bus;
 each of said elements comprising arbitration means for determining bus priority of one element relative to another element, said arbitration means coupled to said common bus;
 each of said arbitration means comprising means coupled to said common bus for generating an arbitration code;
 said common bus comprising means for forming a composite complementary code from a plurality of said arbitration codes; and
 each of said arbitration means comprising means coupled to said common bus for decoding said composite complementary code for determining the priority of said element.

2. The combination as recited in claim 1 wherein:
 each of said elements includes a signal processor, a mass memory or an input-output controller.

3. The combination as recited in claim 1 wherein:
 said arbitration code comprises a series of bits and the complement of said bits.

4. The combination as recited in claim 1 wherein:
 said composite complementary code forming means comprises a wire-ORed bus.

5. In combination:
 a plurality of elements interconnected by an asynchronous common bus;
 each of said elements comprising arbitration means for determining the bus priority of one element relative to another element, said arbitration means coupled to said common bus;
 each of said arbitration means comprising means coupled to said common bus for generating an arbitration code;
 said common bus comprising means for forming a composite complementary code from a plurality of said arbitration codes;
 each of said arbitration means comprising means coupled to said common bus for decoding said composite complementary code for determining the priority of said element; and
 said arbitration means comprising arbitration control means coupled to said decoding means for synchronizing the formation of said composite complementary code on said bus.

6. The combination as recited in claim 5 wherein:
 each of said elements includes a signal processor, a mass memory or an input-output controller.

7. The combination as recited in claim 5 wherein:
 said arbitration code comprises a series of bits and the complement of said bits.

8. The combination as recited in claim 5 wherein:
 said composite complementary code forming means comprises a wire-ORed bus.

9. The combination as recited in claim 5 wherein:
 said decoding means further comprises means coupled to said arbitration control means for determining if said element is a lower priority element thereby removing said element's arbitration code from said bus.

10. The combination as recited in claim 5 wherein:
 each of said elements further comprises element address register means coupled to said decoding means and said common bus for changing an element's priority by changing the address of said element.

11. In combination:
 a plurality of elements interconnected by an asynchronous common bus;
 each of said elements comprising arbitration means for determining the bus priority of one element relative to another element, said arbitration means coupled to said common bus;
 each of said arbitration means comprising means coupled to said common bus for generating an arbitration code;
 said common bus comprising means for forming a composite complementary code from a plurality of said arbitration codes;
 each of said arbitration means comprising means coupled to said common bus for decoding said composite code;
 said arbitration means comprising arbitration control means coupled to said decoding means for synchronizing the formation of said composite complementary code on said bus; and
 said decoding means comprising means for generating a WIN signal to initiate transmitting information on said bus after arbitration is completed.

12. The combination as recited in claim 11 wherein:
 each of said elements includes a signal processor, a mass memory or an input-output controller.

13. The combination as recited in claim 11 wherein:
 said arbitration code comprises a series-of bits and the complement of said bits.

14. The combination as recited in claim 11 wherein:
 said composite complementary code forming means comprises a wire-ORed bus.

15. The combination as recited in claim 11 wherein:
 said decoding means further comprises means coupled to said arbitration control means for determining if said element is a lower priority element thereby removing said element's arbitration code from said bus.

16. The combination as recited in claim 11 wherein:
 each of said elements further comprises element address register means coupled to said decoder means and said common bus for changing an element's priority by changing the address of said element.

17. In combination:
 a plurality of elements interconnected by an asychronous common bus;
 means for generating a request in each of said elements to occupy said common bus;
 means coupled to said common bus in each of said elements for providing an element arbitration code for each of said elements;
 said common bus comprising means for performing a logical-OR of each bit of said element arbitration code on said bus for each of said elements forming a composite complementary code;
 means coupled to said common bus in each of said elements for decoding said composite complementary code simultaneously thereby identifying lower priority elements for removal from said bus;

means coupled to said decoding means for removing each element's arbitration code from said common bus when said element has a lower priority arbitration code relative to another element supplying an arbitration code to said bus; and means for performing composite complementary code generation and decoding sequences until only a highest priority element of said plurality of elements remains on said bus and uses said bus for information transfer.

18. The combination as recited in claim 17 wherein: each of said elements includes a signal processor, a mass memory or an input-output controller.

19. The combination as recited in claim 17 wherein: said arbitration code comprises an address of said element.

20. The combination as recited in claim 17 wherein: each of said elements further comprises element address register means coupled to said decoding means and said common bus for changing an element's priority by changing the address of said element.

21. The combination as recited in claim 17 wherein: said logical-OR performing means for forming said composite complementary code comprises a wire-ORed bus.

22. The method of providing bus arbitration for a plurality of elements requesting simultaneous use of a synchronous common bus, comprising the steps of:

each element generating a request to occupy said common bus;

each element providing to said common bus an element arbitration code;

said common bus performing a logical-OR of each bit of a plurality of said element arbitration codes forming a composite complementary code on said bus;

each element simultaneously decoding said composite complementary code for determining if said element is a lower priority element relative to another element;

each element removing its element arbitration code from said bus when said element has a lower priority arbitration code relative to another element supplying an arbitration code to said bus; and said bus arbitration composite complementary code generation and decoding sequences continuing until only a highest priority element remains on said bus.

23. The combination as recited in claim 17 wherein: said sequences performing means comprises a plurality of parallel AND gate means coupled to said common bus.

24. The combination as recited in claim 23 wherein: said sequences performing means further comprises a priority encoder means coupled to the output of said AND gate means.

25. The combination as recited in claim 24 wherein: said sequences performing means further comprises a conflict multiplexer means coupled to the output of said priority encoder means for generating a LOSE signal, said LOSE signal being coupled to an arbitration control means.

26. The combination as recited in claim 24 wherein: said priority encoder means comprises zero detect means for generating a WIN signal when only said highest priority element remains on said common bus.

* * * * *

UNITED STATES PATENT OFFICE
CERTIFICATE OF CORRECTION

Patent No. 4,402,040　　　　　　　　Dated August 30, 1983

Inventor(s) Ronald C. Evett

It is certified that error appears in the above-identified patent and that said Letters Patent are hereby corrected as shown below:

In the Abstract

Line 12:　Change "aribration" to --arbitration--; and

Line 15:　Change "f" to --fail--.

Column 1, Line 42:　Change "polarity" to --priority--.

In the Claims

Claim 13, Column 8, Line 39:　Change "series-of" to

--series of--.

Signed and Sealed this

Twenty-seventh Day of December 1983

[SEAL]

Attest:

GERALD J. MOSSINGHOFF

Attesting Officer　　Commissioner of Patents and Trademarks